United States Patent
Marcatili

[11] 4,028,081
[45] June 7, 1977

[54] METHOD FOR MANUFACTURING HELICAL OPTICAL FIBER

[75] Inventor: Enrique Alfredo Jose Marcatili, Rumson, N.J.

[73] Assignee: Bell Telephone Laboratories, Incorporated, Murray Hill, N.J.

[22] Filed: Sept. 28, 1976

[21] Appl. No.: 727,464

Related U.S. Application Data

[62] Division of Ser. No. 639,842, Dec. 11, 1975.

[52] U.S. Cl. .................................. 65/2; 28/1.2; 28/72.1; 57/34 HS; 65/11 W; 65/12; 65/DIG. 7; 264/1; 264/168; 350/96 B
[51] Int. Cl.² ........................................ C03B 37/02
[58] Field of Search ......... 350/96 R, 96 B, 96 WG; 65/2, 12, 11 R, 11 W, DIG. 7, 13; 264/168, 1; 57/34 HS; 28/1.2, 72.1, 259

[56] References Cited

UNITED STATES PATENTS

| | | | |
|---|---|---|---|
| 1,151,487 | 8/1915 | Loewe | 425/DIG. 217 |
| 2,313,630 | 3/1943 | Dockerty | 65/11 W X |
| 2,542,973 | 2/1951 | Abernathy | 264/168 |
| 2,708,813 | 5/1955 | Bourgeaux | 65/12 X |
| 3,063,094 | 11/1962 | Warthen | 65/12 X |
| 3,282,668 | 11/1966 | Mabru | 65/12 |
| 3,292,270 | 12/1966 | Spunt | 28/72.1 X |
| 3,538,206 | 11/1970 | Hann | 264/168 X |
| 3,553,952 | 1/1971 | McIntosh | 57/34 HS |
| 3,696,478 | 10/1972 | Elliott et al. | 28/72.1 |
| 3,912,478 | 10/1975 | Presby | 65/2 |

FOREIGN PATENTS OR APPLICATIONS

| | | | |
|---|---|---|---|
| 1,235,528 | 5/1960 | France | 65/12 |
| 927,100 | 5/1963 | United Kingdom | 264/168 |

*Primary Examiner*—Robert L. Lindsay, Jr.
*Attorney, Agent, or Firm*—Bryan W. Sheffield

[57] ABSTRACT

An optical cable which is relatively immune to the effects of bending and/or tension comprises a helical optical fiber loosely confined within a protective sheath. Apparatus is disclosed for fabricating the helical fiber. For example, as the fiber is drawn from a heated preform the fiber is subjected to periodic, pulsating jets of an inert gas, such as nitrogen, which physically deform the fiber into the desired helical configuration.

9 Claims, 21 Drawing Figures

METHOD FOR MANUFACTURING HELICAL OPTICAL FIBER

This is a division of application Ser. No. 639,842 filed Dec. 11, 1975.

BACKGROUND OF THE INVENTION a. Field of the Invention

Broadly speaking, this invention relates to optical fibers. More particularly, in a preferred embodiment, this invention relates to methods and apparatus for manufacturing an optical fiber which is relatively insensitive to the effects of stress and bending.

b. Discussion of the Prior Art

As is well known, the feasibility of transmitting communication signals over optical fibers has been successfully demonstrated in the laboratory. Attention is currently focused on the development of practical systems for use in the field. The present thinking is that one of the first commercial uses of such optical communication systems will be in densely populated metropolitan areas, such as New York City, where existing cable ducts are straining at the seams and the cost of construction new duct work is prohibitively expensive. Under these circumstances, optical cables are extremely attractive because of their inherently smaller cross-section.

There are, of course, significant differences between the copper conductors used in conventional telecommunications systems and the fibers used in optical communications systems. A conventional cable comprising a plurality of insulated copper conductors, for example, may be subjected to considerable tension and to severe bending without significantly affecting transmission through the cable. Optical fibers, on the other hand, being comprised of glass are considerably more delicate and when subjected to excessive tension the fibers break. When subjected to even moderate bending of the right periodicity, the coupling between guided and unguided modes in the fiber will dramatically increase, resulting in unacceptably high radiation losses; hence, severe attenuation of the signals carried by the fiber.

It is known that by encapsulating optical fibers in protective sheaths of soft and hard plastics, the radiation problem can be solved but the thickness of these plastics may make the cable too large for their intended use.

SUMMARY OF THE INVENTION

The problem, then, is to devise a configuration for an optical fiber, and techniques for fabricating the same, which render the fiber relatively insensitive to the effects of stress and bending. In a preferred embodiment, the configuration that solves this problem comprises an optical fiber in the form of an elongated helix. Advantageously, if the diameter of the helix is $d$ and its pitch $l_o$, then $l_o>>d$. To manufacture such a fiber, existing apparatus wherein a substantially vertically disposed preform is heated and the fiber is drawn from the softened preform is modified by the provision of means for deforming the fiber as it is drawn from the preform thereby to yield the desired helical fiber.

Several alternative ways are disclosed for providing the desired deformation. For example, in one embodiment the deforming means comprises means for directing a first, pulsating jet of gas at the optical fiber with a velocity sufficient to deflect the fiber from its normal path of travel, a means for directing a second pulsating jet of gas at the fiber with a velocity sufficient to deflect the fiber from its normal path of travel, the axis of the second jet being orthogonally disposed with respect to the axis of the first jet, and means for establishing a predetermined phase relationship between the first and second pulsating jets.

The invention and its mode of operation will be more fully understood from the following detailed description, when taken with appended drawings, in which:

DETAILED DESCRIPTION OF THE INVENTION

Figure 1:
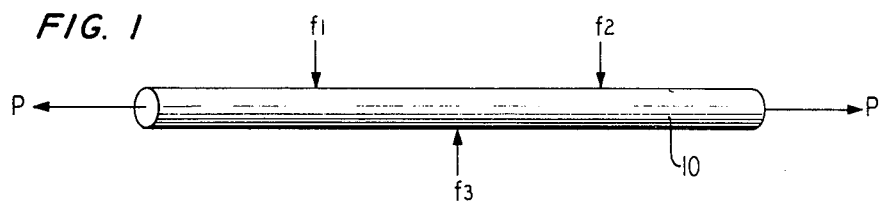
FIG. 1 is a view of a typical optical fiber subjected to both lateral and transverse forces.

FIG. 1 depicts a typical optical fiber 10 which is subjected to tension forces P and lateral forces $f_1, f_2, f_3$. These forces could arise, for example, if fiber 10 was contained within a plastic sheath or jacket which was deformed in some way, for example, by bending. The forces $f_1, f_2$ and $f_3$ could, for example, be transmitted to the fiber via the deformation of the surrounding jacket. Under these circumstances, fiber 10 is subjected to stress and rather sharp bending which tends to break the fiber and/or to increase the radiation losses therein.

Figure 2:
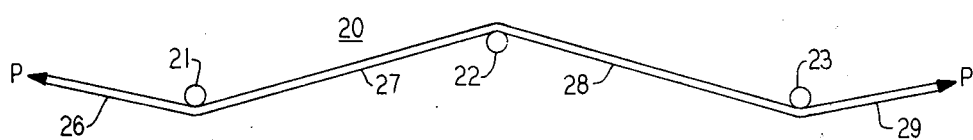
FIG. 2 is a diagram useful in analyzing the deformation of an optical fiber subjected to the forces shown in FIG. 1.

FIG. 2 is useful in explaining what happens when an optical fiber is stressed in the manner shown in FIG. 1. As shown, element 20 represents a glass filament which is under tension P and which is subjected to localized transverse forces applied by elements 21, 22, and 23 which might, for example, comprise pins in a supporting medium. If the force P is of sufficient magnitude, filament 20 will appear to be four straight segments, 26, 27, 28 and 29, connected by short portions having radii of curvature similar to those of the pins. However, if the force P which causes the tension in the filament is very low, the filament will tend to follow the path dictated by the pins but the radius of curvature at any point in the filament will be much greater than that of the pins which control the path of the filament.

Figure 3:
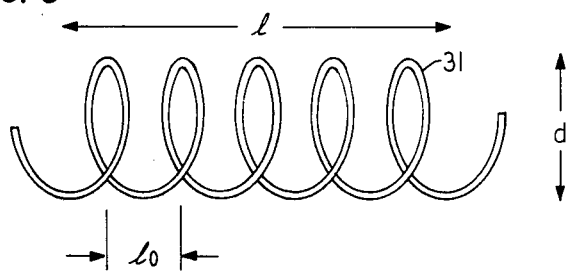
FIG. 3 is a view of an elongated, helical, optical fiber according to the invention $(l_o>>d)$.

The above analysis led to the realization that if an optical fiber could be fabricated having a configuration such that the fiber would be substantially insensitive to the degree of tension applied to the fiber and to the radius of curvature of any bends which might be formed therein, the above problem could be overcome. As shown in FIG. 3, one such configuration is that of a helix 31 having a period $l_o$ which is long compared to the diameter $d$ of the helix, that is to say where $l_o >> d$. It will be apparent that a fiber having such a configuration can readily be deformed without introducing stresses of sufficient magnitude to fracture the fiber and without introducing short local radii of curvature that induce micro-cracking losses. Of course, the size of the helix is greatly exaggerated in the drawing to simplify the explanation of the invention.

In an optical cable, there will, of course, be a plurality of optical fibers contained within some suitable protective sheath or jacket.

Figure 4:
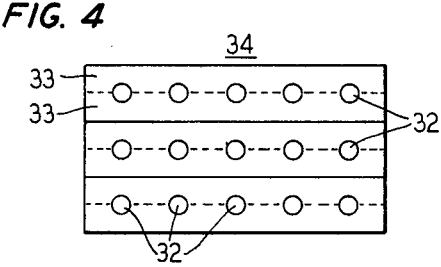
FIG. 4 is a cross-sectional view of an arrangement of optical fibers for a cable comprising a plurality of tapes forming a $n \times m$ matrix of helical fibers of the type depicted in FIG. 3.
Figure 5:
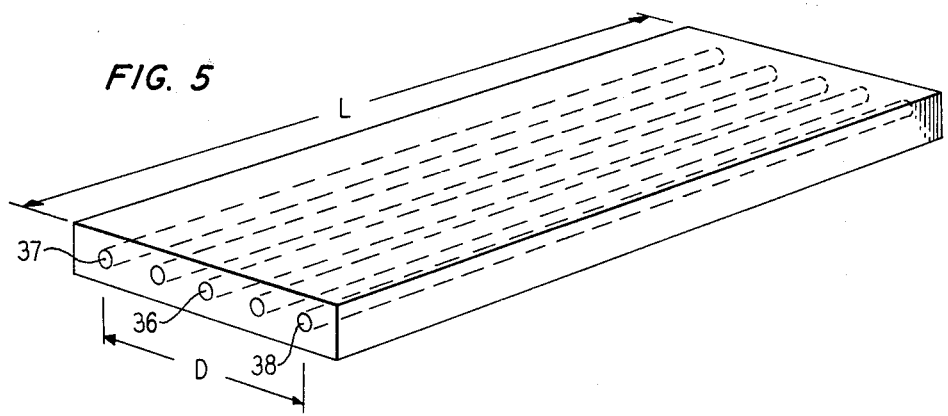
FIG. 5 is an isometric view of one of the ribbons shown in FIG. 4.

FIG. 4 shows one format of tapes or ribbons for such an optical cable. As shown, a plurality of optical fibers 32 are sandwiched between two layers of adhesive tape 33 and then $n$ such sandwiches or tapes are stacked and stranded at the center of the cable. It will be readily apparent that when the cable is bent, for example by inserting the cable into a duct, some of the fibers in the cable will be compressed and others will be under tension. More specifically, FIG. 5 shows one of the ribbons of the multi-layer cable shown in FIG. 4 without the twist due to stranding. Consider the centermost fiber 36 and the two outermost fibers 37 and 38. Let us assume that this tape has cylindrical bores formed therein inside of which optical fibers having the helical configuration shown in FIG. 3 are loosely accommodated. Let L represent the length of the untwister layer, and let us further assume that upon stranding all strains are taken up by the tape and not by the fibers. Under these circumtances $L_A$, the length of the outermost cylinders which contain fibers 37 and 38, will be given approximately by the expression:

$$L_A = L \left[ 1 - \frac{1}{4}\left(\frac{\pi D}{L_o}\right)^2 \right] \tag{1}$$

where $D$ is the separation between the outermost fibers 37 and 38, $L_o$ is the period of the strand and the assumption is made that $$D/L_o << l.$$

By analogous reasoning, $L_B$, the length of the cylinder which contains fiber 36, is given by the equation:

$$L_B = L \left[ 1 + \frac{1}{4}\left(\frac{\pi D}{L_o}\right)^2 \right]. \tag{2}$$

From equations 1 and 2 it will be seen that the central portion of the tape is under compression and the outermost portions of the tape are under tension. When the tape is in an untwisted condition, all of the optical fibers will have a helix length L, but the actual length of the fibers in the bores is given by the equation:

$$L_f = L \left[ 1 + \frac{1}{2}\left(\frac{\pi d}{l_o}\right)^2 \right], \tag{3}$$

where $d$ is the actual diameter of the helix and $l_o$ is its period. AFter stranding of the tape, the helix length of the deformed fibers must also be $L_A$ and $L_B$ and the new diameters of the helical fibers in the cylinders are $d_A$ and $d_B$ which, from equations 1, 2, and 3 are calculated to be:

$$d_A = d \sqrt{1 + \frac{1}{2}\left(\frac{Dl_o}{dL_o}\right)^2} \tag{4}$$

and $$d_B = d \sqrt{1 - \frac{1}{2}\left(\frac{Dl_o}{dL_o}\right)^2}. \tag{5}$$

Assume now that $d_B = 0$, that is, assume that the outermost fibers in the tape are no longer helical in shape. Then, from equations 4 and 5, $$d_A = \sqrt{2}\, d = \frac{Dl_o}{L_o} \tag{6}$$

and $$d = \frac{1}{\sqrt{2}} \frac{Dl_o}{L_o}. \tag{7}$$

Considering an optical fiber tape having parameters as follows:

$D = 4$ mm
$l_o = 10$ mm
$L_o = 200$ mm, we obtain from equations 1–5, $d_A = 0.2$ mm; and
$d = 0.14$ mm.

Now it is clear that the cylindrical bores within the tape which house the helically-wound fibers must have a diameter which is somewhat larger than $d_A$. From a practical standpoint, if this proves too difficult to manufacture, the diameter of the helix of fiber 36 in the central bore could be made smaller than $d$.

Figure 6:
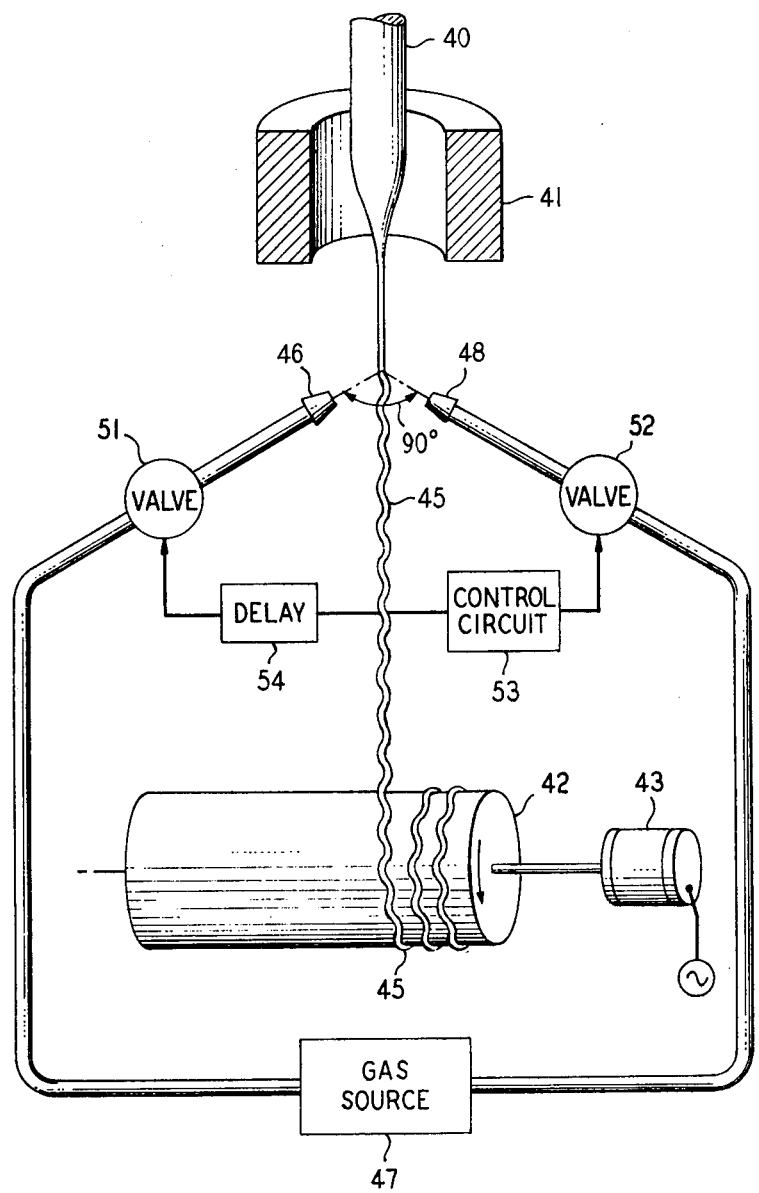
FIG. 6 is a partially schematic, partially diagrammatic view of an illustrative apparatus for manufacturing the helical fiber shown in FIG. 3.

Let us now consider various techniques for manufacturing the helical fiber shown in FIG. 3. FIG. 6 is a diagram of a known apparatus for pulling an optical fiber from a glass preform, for example, the apparatus disclosed in copending application Ser. No. 479,820, filed June 17, 1974 in the name of H.M. Presby. Briefly, and as disclosed in that application, a preform 40 is circumferentially heated by an oven 41 while simultaneously being pulled by a drum 42 driven by a motor 43, thereby to yield an optical fiber 45. In accordance with the invention, this known apparatus is modified by the provision of a first nozzle 46 through which some suitable inert gas, such as nitrogen, from a source 47 is applied to the molten fiber. A second nozzle 48, the longitudinal axis of which is orthogonal to the axis of nozzle 46, also applies a jet of inert gas from source 47 to the fiber. The gas from source 47 passes through a pair of valves 51 and 52 which periodically interrupt the flow of gas to nozzles 46 and 48, respectively. Thus, both nozzles supply a periodic jet of gas to the floor. Both valves are controlled by a control circuit 53, but the control signal to valve 51 passes through a delay circuit 54 which delays the control signal. As a result, the exit of the gas alternates between nozzles 46 and 48, thus, the gas jets have the same period but opposite phase. Both nozzles axes and the fiber axes are perpendicular to each other. Unlike the gas jets disclosed in the above-referenced, copending application, the forces directed onto the molten fiber by nozzles 46 and 48 are of sufficient magnitude to physically deform the fiber and cause it to assume a helcial configuration as it is drawn out of the preform. The periodicity of the gas jets must obviously be related to the rate at which the fiber is drawn from the preform and this period is advantageously selected such that the pitch of the helix which is formed is much larger than the diameter of the fiber.

Figure 7:
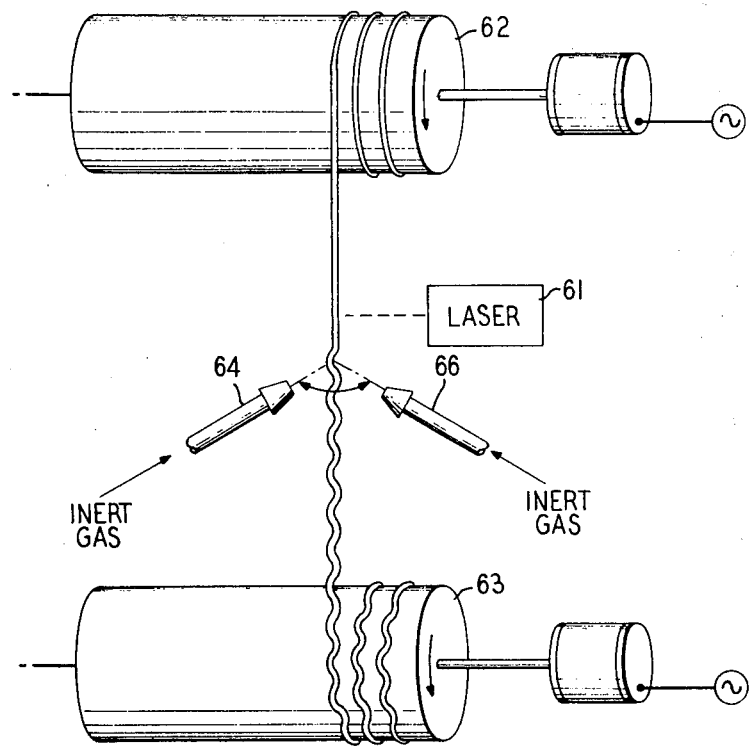
FIG. 7 is a partially schematic, partially diagrammatic view of an alternative apparatus for manufacturing a helical fiber.

FIG. 7 depicts a variation of the apparatus shown in FIG. 5 which may be used in situations where the fiber has already cooled to the solid state. Accordingly, in this second embodiment of the invention a heat source 61, which may comprise, for example, a $CO_2$ laser or a gas flame, is applied to the fiber to partially soften the fiber while it is being fed from a supply reel 62 to a take-up reel 63. As in FIG. 6, a pair of orthogonally oriented, out-of-phase jets 64 and 66 are positioned such that a period stream of inert gas impinges on the softened fiber to deform it into the desired helical configuration.

Figure 8:
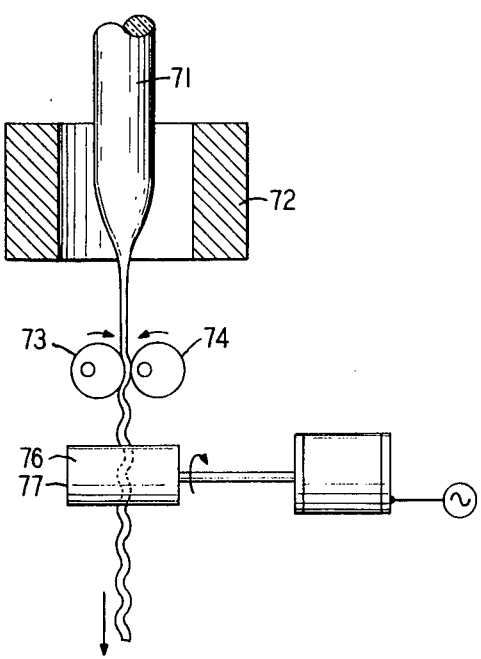
FIG. 8 is a partially schematic, partially diagrammatic drawing of yet another embodiment of the invention wherein the fiber is mechanically deformed into the helical configuration.

FIG. 8 depicts yet another embodiment of the invention wherein the desired helical configuration is achieved by mechanical deformation of the fiber. As shown, a preform 71 is heated by an oven 72 to melt the preform and the fiber is then drawn from the molten preform by some suitable take-up drum (not shown). As the fiber is drawn from the preform, it is passed between a first pair of eccentrically mounted rollers 73 and 74 which are advantageously comprised of some inert substance, such as Teflon, to mechanically deform the still molten fiber. A second pair of eccentrically mounted rollers 76 and 77 having their axes of rotation orthogonal to the axes of rotation of rollers 73 and 74 cooperate with the first pair of rollers to mechanically deform the fiber into the desired helical configuration. Some suitable means, which may be electrical or mechanical, must be provided to ensure and maintain the appropriate phase relationship between the two pairs of eccentric rollers.

Of course, the manufacture of a helical fiber need not be associated with the drawing process. By analogy to the apparatus shown in FIG. 7, the mechanical deformation could be accomplished on a finished fiber by re-heating the fiber as it is transferred from a supply reel to a take-up reel and then passing the fiber through the eccentric rollers while still molten.

Figure 9:
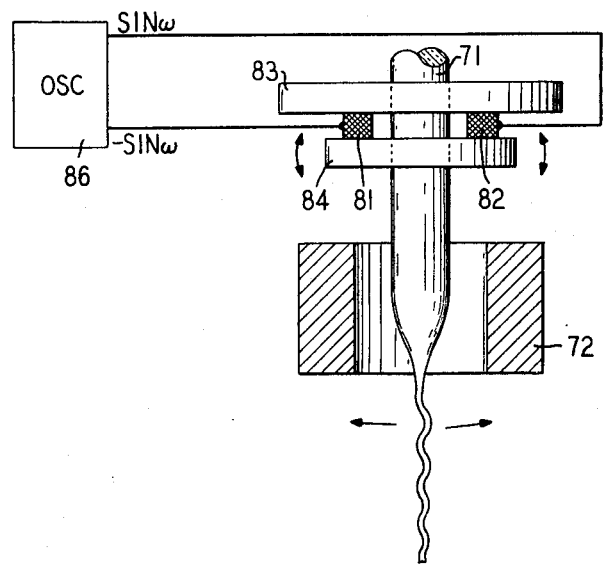
FIG. 9 is a partially schematic, partially diagrammatic drawing of another embodiment of the invention wherein the preform from which the fiber is drawn is mechanically deflected.

FIG. 9 depicts yet another embodiment of the invention. As shown, the previously disclosed fiber-drawing apparatus is modified by providing a pair of piezoelectric transducers 81 and 82 mounted to and dependent from a rigid, fixed support member 83. A movable member 84 is fastened to the transducers and has an aperture which is only slightly larger than the preform. The transducers are energized by an oscillator 86, however, the signal which is fed to transducer 81 is inverted with respect to the signal fed to transducer 82. Thus, movable member 84 pivots up and down about its midpoint and as it does so, it imparts a side-to-side rocking motion to the preform. The apparatus further includes a second pair of piezoelectric transducers (not shown in the drawing) which are orthogonally oriented with respect to the first pair of transducers and energized from the same source. However, the signals energizing the second pair of transducers are 90° out-of-phase with respect to the signals energizing transducers 81 and 82, thus, the second pair of transducers rock the preform in a direction which is orthogonal to the rocking which is induced by transducers 81 and 82. Thus, as the fiber is drawn from the preform, an oscillatory motion is imparted to the fiber such that the fiber is drawn into the desired helical configuration. Again this embodiment of the invention could also be used with an already formed fiber by reheating the fiber, as shown in FIG. 7, prior to imparting the oscillatory motion to the fiber.

Figure 10:
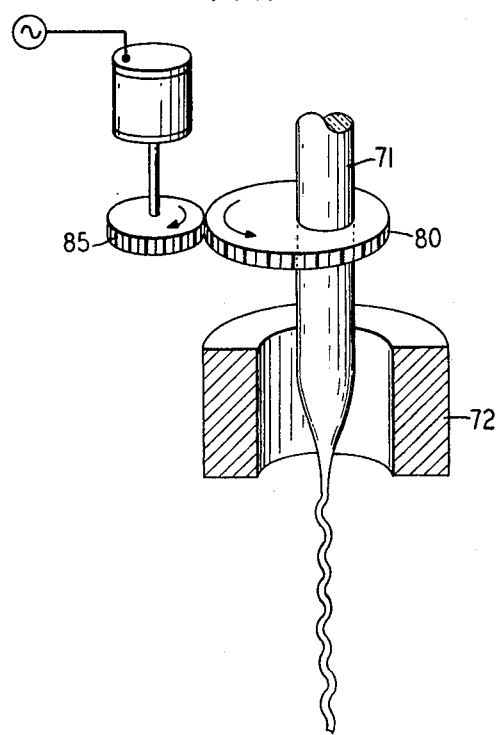
FIG. 10 is a partially schematic, partially diagrammatic drawing of yet another embodiment of the invention wherein the preform is eccentrically rotated as the fiber is drawn therefrom.

FIG. 10 depicts yet another embodiment of the invention wherein the preform is attached to a circular clamping member 80 which is toothed in the illustrative example. The aperture in member 80 which contains the preform is offset with respect to the axis of rotation of member 80. Thus, when member 80 is rotated, for example, by a toothed drive member 85, for example, by some suitable motor 82 and gear 83, the entire preform is rotated with respect to the axis of member 80. Thus, as the fiber is drawn from the heated preform the eccentric rotation of the preform causes the fiber to assume the desired helical configuration. Of course, the degree of eccentricity is greatly exaggerated in the drawing.

Figure 11:
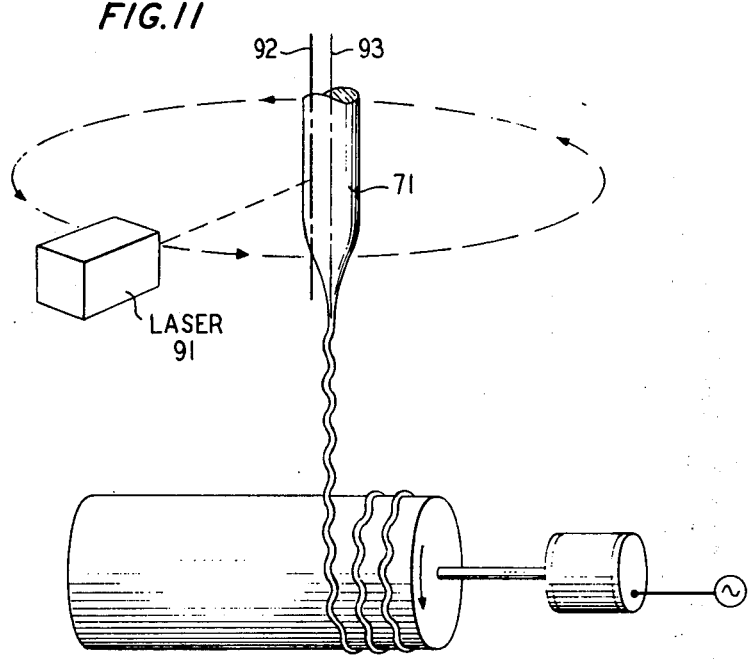
FIG. 11 is a partially schematic, partially diagrammatic drawing of yet another embodiment of the invention wherein an eccentrically rotated heat source applied preferential heating to the preform, as the fiber is drawn therefrom.

FIG. 11 depicts yet another embodiment of the invention. In this embodiment, the preform is heated by a focused laser beam from a laser 91 which rotates around the preform. However, the axis of rotation 92 of the laser is offset from the axis 93 of the preform. The resulting eccentric heating of the preform will generate preferential heating and cause portions of the preform to flow more readily than others, thus resulting in a helical fiber being drawn from the preform.

Figure 12:
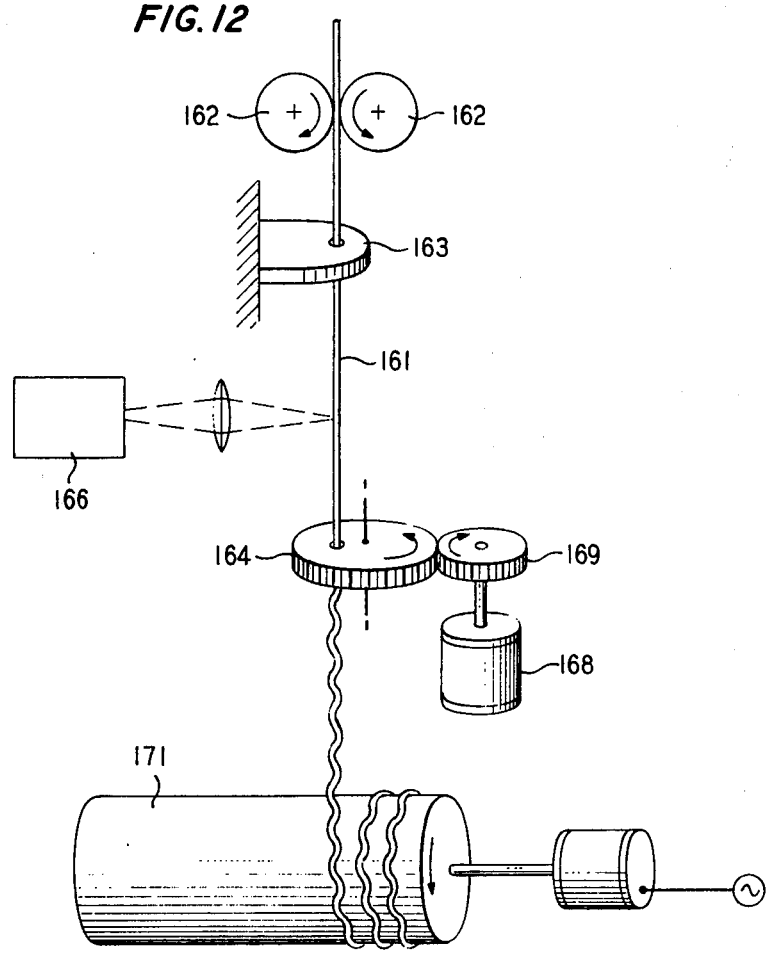
FIG. 12 is a partially schematic, partially diagrammatic drawing of yet another embodiment of the invention for producing a helically wound fiber.

FIG. 12 depicts yet another embodiment of the invention wherein an optical fiber 161 passes through a pair of feed rollers 162—162, then is threaded through an aperture in a fixed guide-member 163 and a corresponding aperture in a geared, rotatable guide-member 164. Advantageously, guide-members 163 and 164 are fabricated from soft material, such as Teflon, to avoid mechanical damage to the fiber. The output of a laser 166, for example, a CW $CO_2$ laser, is focused by a lens 167 onto the fiber 161 to melt the same. Guide-member 164 is rotated by a motor 168, via a reduction gear 169, and the circular motion which is imparted to the molten fiber by rotatable guide-member 164 induces a helical twist in the fiber, just prior to cooling. The twisted fiber is then gathered up on a take-up reel 171 as previously. From the point of view of the surface quality of the end-product, noncontact methods, such as those shown in FIGS. 6, 7, 9, 10 and 11 will yield better results than the contact methods shown in FIGS. 8 and 12, although the contact method is somewhat easier to implement.

If we assume a typical optical fiber having the parameters previously stated, that is to say, if we assume that the period $L_o$ is 10 millimeters and that the fiber is pulled at a typical rate of 1,000 millimeters per second, then the periodic devices shown in FIGS. 6 through 11 will operate with a period of about 100 cycles per second, which is quite reasonable to implement.

Figure 13:
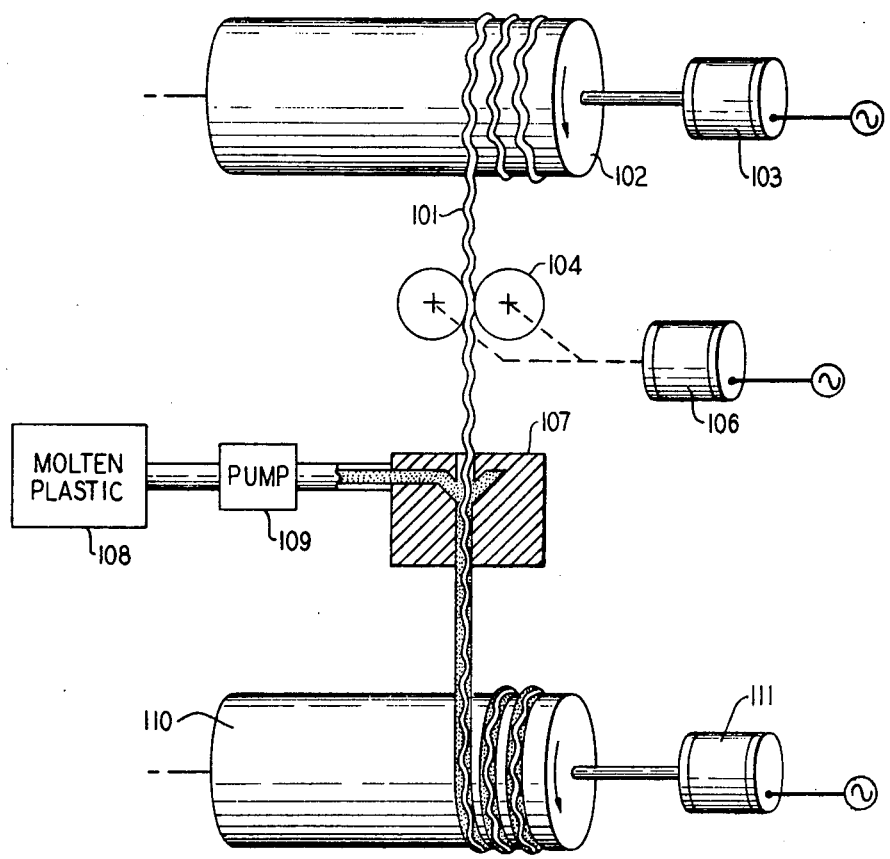
FIG. 13 is a partially schematic, partially diagrammatic view of an illustrative apparatus for forming a protective sheath about the helical fiber shown in FIG. 3.

Let us now consider the problem of how a helical fiber can be loosely placed within a plastic tube or tape. FIG. 13 depicts one apparatus suitable for this purpose. As shown, a previously fabricated helical fiber 101 is housed on a supply reel 102 which is driven by some suitable motor 103. Since the fiber is now in the form of a helical spring, it obviously cannot be pulled from drum 102 without unduly elongating the helix. Accordingly, a pair of rollers 104 driven by a motor 106 are employed to push the fibers, which have been appropriately coated and protected into an extruder 107 which is supplied with molten plastic from a source 108 by means of a pump 109. In a well-known manner, extruder 107 extrudes a plastic sheath around the loose fiber. The sheath and included fiber are then wound-up on a take-up reel 110 which is driven by some suitable motor 111. Because rollers 104 push the fiber towards drum 110 there will be no appreciable tension forces exerted on the fiber between the take-up reel and the rollers. Thus, the helical fiber will lie loosely within the sheath, as is desired.

Figure 14:
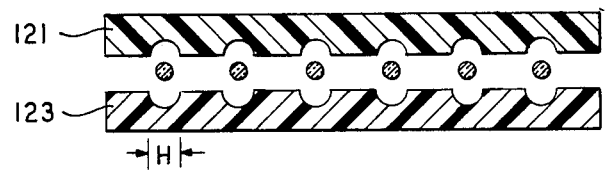
FIG. 14 is a cross-sectional view of an illustrative fiber cable wherein a plurality of helically wound optical fibers are entrapped between two adhesively-coated tapes.
Figure 15:
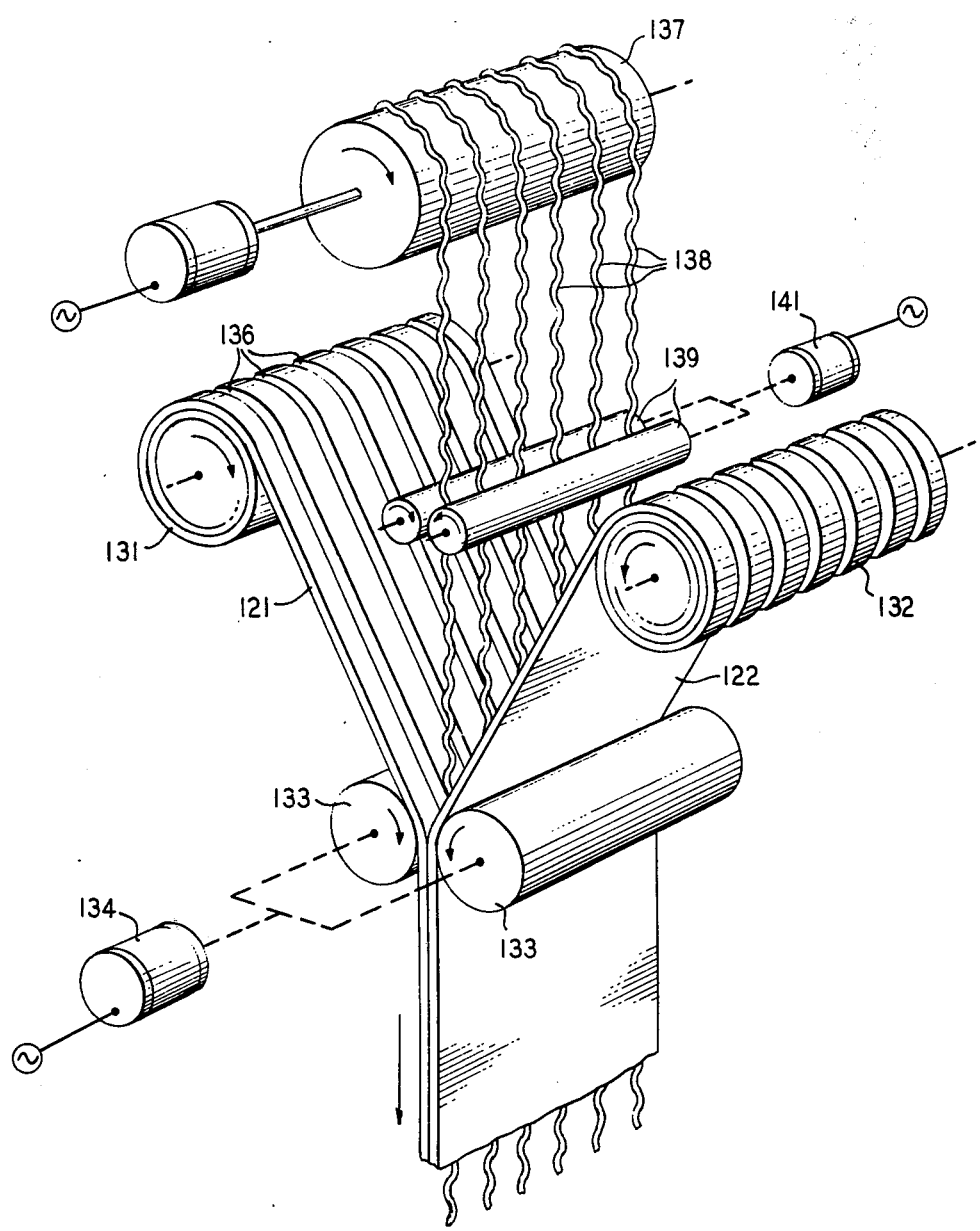
FIG. 15 is an isometric view of an illustrative apparatus for forming the ribbon shown in FIG. 14.
Figure 16:
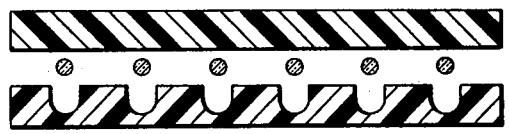
FIG. 16 is a cross-sectional view of an alternative arrangement of the ribbon shown in FIG. 14.

The above-described arrangement yields a single optical fiber within a hollow cylindrical sheath. By way of contrast, FIG. 14 depicts the upper and lower halves 121 and 122 of a tape 113 having a configuration which is suitable for accommodating $n$ such helically wound optical fibers. Obviously, the diameter H of the semicylindrical recesses in the two tape halves must be larger than the diameter that the helical fibers will assume under the most severe axial compressions which will be experienced. FIG. 15 depicts an apparatus for assembling the optical cable shown in FIG. 12. As shown, a pair of supply reels 131 and 132 respectively supply the two halves 121 and 122 of the tape to a pair of pressure rollers 133—133 driven by some suitable motor 134.

The two tape halves each include a plurality of fiber-receiving, semicylindrical recesses 136. A supply reel 137 simultaneously feeds a plurality of helical fibers 138 to a pair of feed rollers 139—139 which are driven by some suitable motor 141. After fibers 138 pass through rollers 139 they are fed into the closing semicylindrical recesses in tape halves 121 and 122. If the tape halves are adhesively coated, the pressure from rollers 133 will seal them. If the tape halves are of the type that must be heat sealed, the rollers 133 may be heated to form the optical cable. Of course, as shown in FIG. 15, it is also possible to employ asymmetric tape halves, provided again that the bore which is provided in the tape is sufficiently large to accommodate the helically wound fibers under even the most severe axial compressions.

Figure 17:
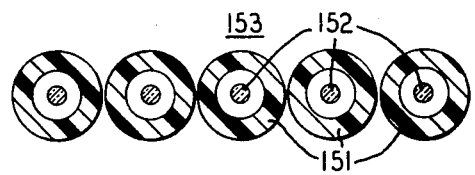
FIG. 17 is a cross-sectional view of ribbon formed by assembling a plurality of jacketed fibers of the type produced by the apparatus shown in FIG. 13.

As shown in FIG. 17, jacketed helical fibers produced, for example, by the apparatus shown in FIG. 12 may be assembled into a multifiber tape. More specifically, FIG. 17 shows a plurality of jacketed optical cables 151, each including a loose, helical-formed optical fiber 152, which are joined together, either thermally or chemically, to form a flat flexible tape 153 which, for the reasons already stated, is relatively insensitive to tension and/or to bending. Of course, $n$ such cables may be stacked to form an $n \times m$ array of fibers. Alternatively, the jacketed helical fibers may themselves be sandwiched between two grooved adhesive tapes, in the manner shown in FIG. 15.

Figure 18:
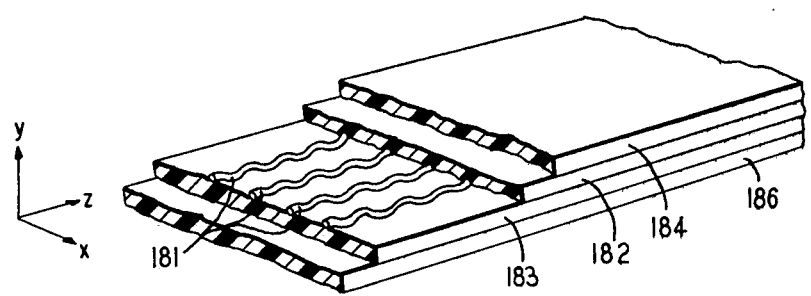
FIG. 18 is a partially cut-away, isometric view of another form of optical cable wherein the fibers are laid down in a serpentine pattern between layers of adhesively-coated tape.

FIG. 18 depicts a somewhat different approach to the problem. Here, the optical fibers 181 are not per se changed in shape; rather, they are sandwiched in a serpentine pattern between two layers of adhesively-backed tape 182, 183. Advantageously, the serpentine pattern is a sinusoid and, as in the case of a helically formed fiber, the wavelength of the sinusoid must greatly exceed the periods that couple guided to radiating modes. To prevent damage to the fibers, the relatively soft adhesive tapes 182 and 183 may themselves be sandwiched between two layers of a somewhat harder material 184–186, such as polyvinyl chloride.

Figure 19:
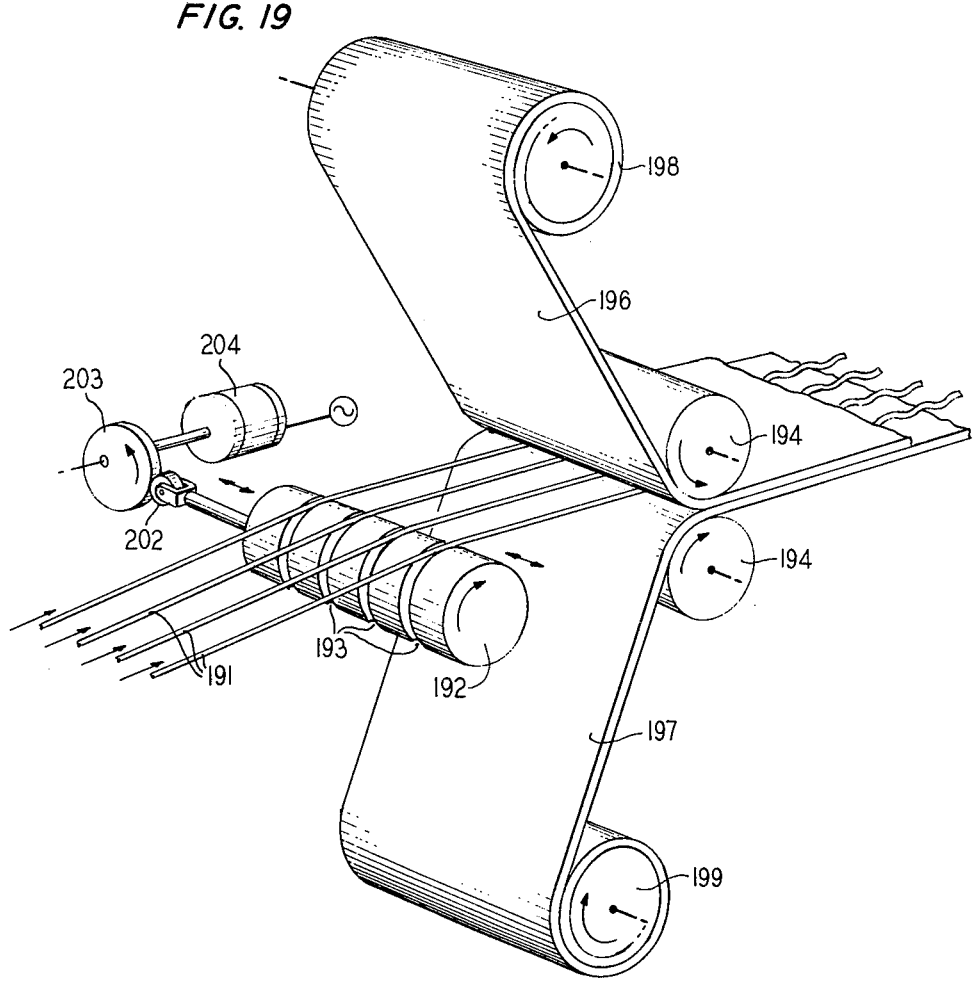
FIG. 19 is an isometric view of an illustrative apparatus for manufacturing the cable shown in FIG. 18.

FIG. 19 depicts an illustrative apparatus that may be used to fabricate a cable having the format shown in FIG. 18. As shown, a plurality of optical fibers 191 are fed from a corresponding plurality of supply reels (not shown) to a roller 192 which has a plurality of circular, fiber-receiving grooves 193 formed therein. After passage through the grooves of roller 192, the fibers pass between a pair of pressure-rollers 194—194 and are thereby sandwiched between a pair of adhesive tapes 196 and 197 supplied to rollers 194 by a corresponding pair of supply reels 198 and 199.

A cam follower 202 mounted to one end of roller 192 contacts a cam 203 which, in turn, is driven by a motor 204. As a result of this camming action, roller 192 oscillates back and forth along its longitudinal axis and as it does so, the grooves in roller 192 impart a side-to-side motion to optical fibers 171 as they are entrapped between the upper and lower adhesive tapes 196 and 197. Thus, the fibers are laid down between the tapes in the desired sinusoidal pattern as shown in FIG. 18.

Figure 20:
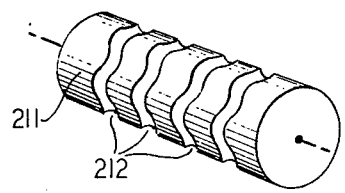
FIG. 20 is an isometric view of an alternative form of roller for use in the apparatus shown in FIG. 19.

As shown in FIG. 20, it is possible to substitute a nonoscillating roller 211 for the roller 192 shown in FIG. 19. However, in this latter event, the grooves 212 in roller 211 are themselves made in a sinusoidal pattern.

Figure 21:
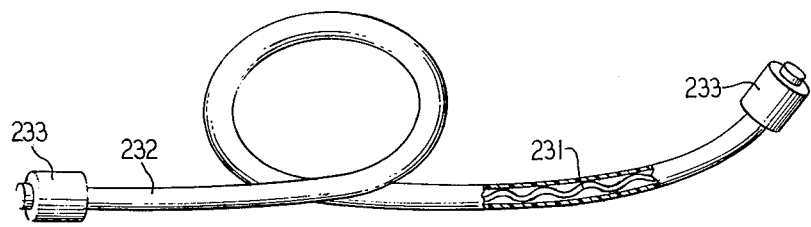
FIG. 21 is a partially cut-away, isometric view of an optical patch cord according to the invention.

Individual helical fibers can also be used in jumpers and pigtails or, in general, wherever tension and unwanted deformation of the fibers must be avoided. For example, FIG. 21 shows the optical equivalent of the ubiquitous patch cord. As shown, a helical fiber 231 is loosely confined in a cylindrical jacket 232 which is provided with suitable optical jacks 233 at both ends. Thus, the patch cord can be used to interconnect various optical apparatus and even if subjected to bending and stress (within reason), the fiber will not be broken or cracked.

In the above-described embodiments the fibers have either been helical or sinusoidal. However, one skilled in the art will appreciate that other configurations are possible and that these configurations may either be periodic or aperiodic. Basically, any deformation that permits loose stuffing of the fiber into the protective plastic sheath can be equally useful.

One skilled in the art may make various changes and substitutions to the layout of parts shown without departing from the spirit and scope of the invention.

What is claimed is:

1. A method of manufacturing an optical fiber in the form of an elongated helix, comprising the steps of:
   heating the lower extremity of a substantially vertically disposed preform to soften the preform; and
   drawing the optical fiber from said softened preform, said method being characterized by the further steps of:
       passing said optical fiber, while still in a softened state, through at least one pair of eccentrically rotatable rollers; and
       rotating said rollers in synchronism with the rate at which said fiber is drawn from the softened preform.

2. The method according to claim 1 wherein said fiber passing step comprises:
   passing said fiber through at least one pair of eccentrically rotatable rollers, each of said rollers having a diameter such that, as the rollers deform the fiber, a helical fiber is formed having a pitch $l_o$ and a diameter $d$, where $l_o >> d$.

3. A method of manufacturing an optical fiber in the form of an elongated helix which comprises the steps of:
   heating the lower extremity of a substantially vertically disposed preform to soften the preform; and
   drawing the optical fiber from said softened preform, said method being characterized by the further steps of:
       positioning an upper portion of said preform within an aperture formed in a fixed member;
       positioning a lower portion of said preform within an aperture formed in a movable member; and
       moving said movable member in an oscillatory manner with respect to said fixed member whereby a corresponding oscillatory movement is induced in said preform, which oscillatory movement generates the desired helical configuration for the fiber.

4. The method according to claim 3 wherein first and second transducers are mounted between said fixed and movable members and symmetrically disposed with respect to said preform, the method being characterized by the further steps of:
   applying a sinusoidal signal to the first transducer to energize the same; and
   simultaneously applying a sinusoidal signal to the second transducer to energize the same, the signal applied to said second transducer being of the same frequency as the signal which is applied to said first transducer but 180° out-of-phase therewith.

5. The method according to claim 4 wherein third and fourth transducers are mounted between said fixed and movable members and symmetrically disposed with respect to said preform but orthogonally oriented with respect to said first and second transducers, the method being characterized by the further steps of:
   applying sinusoidal signals to said third and fourth transducers which are 180° out-of-phase with one another but which have a fixed, 90° phase-shift with respect to the sinusoidal signals applied to said first and second transducers.

6. A method of manufacturing an optical fiber in the form of an elongated helix, comprising the steps of:
   heating the lower extremity of a substantially vertically disposed preform to soften the preform; and
   drawing the optical fiber from said softened preform, characterized in that said preform heating step comprises:
       rotating a heat-source about said preform, the axis of rotation of said heat-source being parallel to, but spaced apart from, the longitudinal axis of said preform whereby said preform is asymmetrically heated, thereby to induce preferential melting of the preform and the desired helical configuration of the fiber drawn therefrom.

7. The method according to claim 6 characterized in that said heat-source rotating step comprises rotating a focused beam of coherent, collimated radiation onto said preform.

8. A method of converting a conventional optical fiber into an optical fiber having the configuration of a helix, characterized by the steps of:
   advancing said fiber past a source of heat to soften the fiber;
   passing said softened fiber through at least one pair of eccentrically rotatable rollers; and
   rotating said rollers in synchronism with the rate at which said fiber is drawn from the preform.

9. A method of converting a conventional optical fiber into an optical fiber having the configuration of a helix, characterized by the steps of:
   advancing said fiber past a source of heat to soften the fiber;
   passing said fiber through an aperture in a first guide means positioned upstream of said heat-source;
   passing said softened fiber through an aperture in a second guide means positioned downstream of said heat-source; and
   rotating said second guide means in a plane which is normal to the longitudinal axis of said fiber thereby rotating said aperture and inducing a helical twist in said fiber.

* * * * *